May 15, 1956 D. F. BLOOM 2,745,438
PIPE THREAD PROTECTOR
Filed Feb. 12, 1954 2 Sheets-Sheet 1

INVENTOR.
DOLORES F. BLOOM
BY Naylor and Lassagne
ATTORNEYS

May 15, 1956          D. F. BLOOM          2,745,438

PIPE THREAD PROTECTOR

Filed Feb. 12, 1954          2 Sheets-Sheet 2

INVENTOR.
DOLORES F. BLOOM
BY Naylor and Lasagne
ATTORNEYS

United States Patent Office 2,745,438
Patented May 15, 1956

2,745,438

PIPE THREAD PROTECTOR

Dolores Floyd Bloom, Bakersfield, Calif.

Application February 12, 1954, Serial No. 410,011

3 Claims. (Cl. 138—96)

This invention relates to a pipe thread protector and more particularly to a pneumatically actuated pipe thread protector for protecting the threads on the ends of large, heavy metal pipe against damage during transportation and storage previous to its installation at a place of use.

In the drilling or production of an oil well a real problem arises in protecting the threads of pipe to be used, particularly such pipe as is used in the running of an oil well casing. This pipe is generally quite large, ranging in size from five inches to fourteen inches in diameter and up to forty feet in length, and since it is ordinarily threaded at the steel plant where it is manufactured, the threads are often so damaged during storage and transportation that the pipe can not be used in the field as required, but must be rethreaded or returned to the steel plant for salvaging. In order to solve this problem, numerous devices have been developed for the purpose of protecting the threads of such pipe as for example detachable sleeve type protectors adapted to fit over the threaded area at the ends of the pipe. To my knowledge, however, such prior devices have not proved to be entirely successful and satisfactory principally for the reason that such protectors did not have the combined characteristics of a simple and sturdy construction and at the same time adapted to be quickly and easily placed on the pipe and removed therefrom; this latter feature being of primary importance in the drilling of an oil well as time is often of the essence where, after the casing pipe has been positioned by the drilling derrick, it is essential that that the pipe be quickly coupled and run in order to protect the bore of the well.

The essential object of the present invention is to provide a novel pneumatically actuated pipe thread protector for protecting the threads on the ends of large, heavy metal pipe; which is of simple and sturdy construction; which can be quickly and easily placed on the pipe and removed therefrom; and which will effectively remain in position without occasioning a gouging of the walls of the pipe during the moving of such pipe from one place to another and during storage thereof.

This object of my invention is achieved essentially by providing a device of the character above stated in which a cylindrical shell member is adapted to enclose the threaded end of a pipe section, said shell member including a toroidal recess disposed so as to abut a wall of such a pipe section when the shell member is positioned in enclosing relation with an end thereof, and a toroidal bladder disposed in such recess, said bladder being pneumatically expansible between a wall of the recess and a wall of such pipe section to releasably retain the shell member in enclosing relation with the end of the pipe section.

Other objects, advantages and features of my invention may appear from the following description of the accompanying drawings illustrating the invention in accordance with its preferred embodiments, in which drawings.

Referring generally to the drawings, the numeral 10 designates the end portion of a conventional large diameter, heavy steel pipe provided with external threads 11 extending back some distance from the end thereof. It will be noted that the outside diameter of the threaded portion of the pipe 10 tapers slightly from the end to the unthreaded portion.

Figure 1:
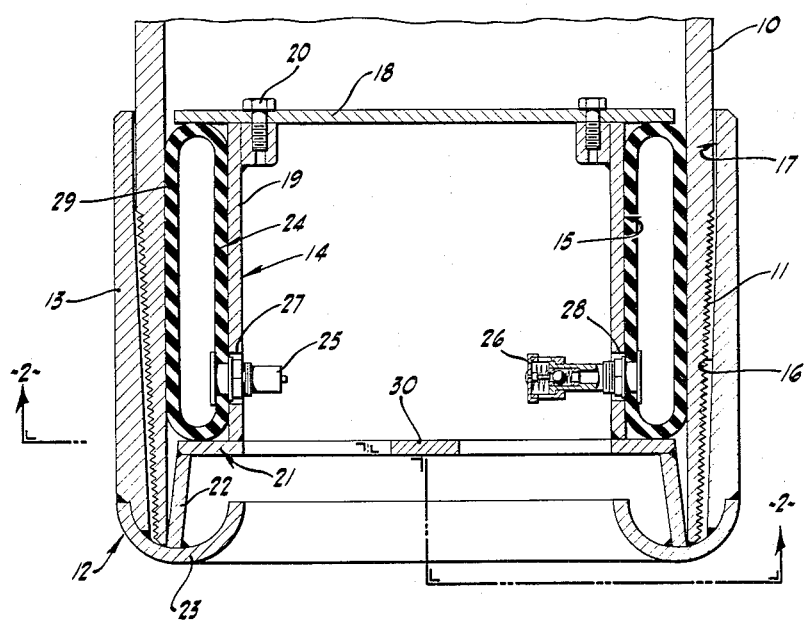
Figure 1 is a longitudinal sectional view of a device embodying the present invention.
Figure 2:
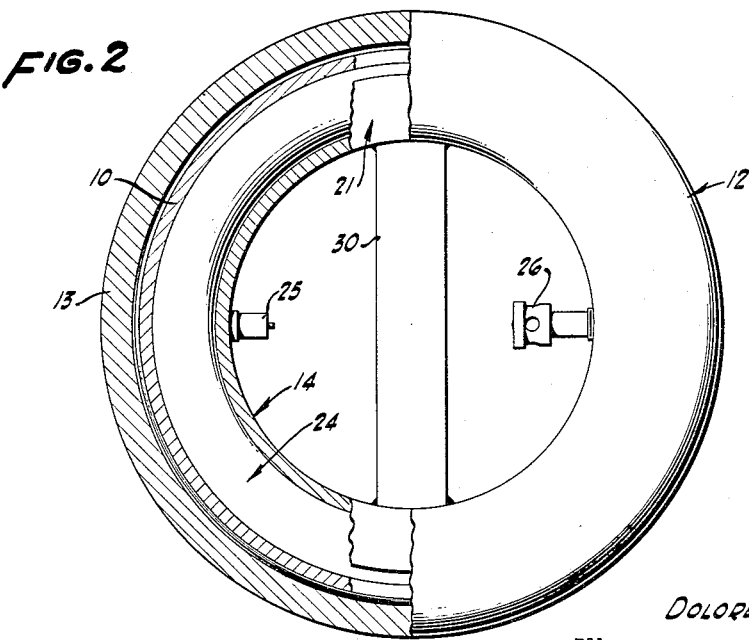
Figure 2 is an end view in elevation, partly in section, taken on line 2—2 of Figure 1.

As shown in Figures 1 and 2, the thread protector, in accordance with the preferred embodiment therein illustrated, comprises a cylindrical shell member, generally designated as 12, which includes an outer sleeve portion 13 arranged for disposition adjacent to and extending slightly beyond the threads 11, and an inner sleeve portion 14 which is formed to provide a toroidal recess 15 arranged for disposition adjacent to an inner circumferential wall portion of the end portion 10 of the pipe. The sleeve portion 13 may either be in the form of a true cylinder or may, as shown, have its outermost edge of reduced diameter such that the intermediate portion 16 corresponds to and is slightly spaced from the tapered threaded area 11. In both of these forms the innermost portion 17 extending beyond the threaded area 11 will be of such diameter as to be in close fitting engagement with the pipe 10 and the protector can be applied, in either case, without damage to the pipe threads 11 because of the taper of the threaded area.

The inner sleeve portion 14 of the cylindrical shell member 12 includes an inner circular plate 18 secured, in the manner shown, to a tubular member 19 by means of the bolts 20. The outer end of the tubular member 19 is connected to a transversely extending circular flange 21 which in turn is joined to a tapered and outwardly projecting ring 22. The inner and outer sleeve portions 13 and 14 are rigidly connected in fixed and radially spaced relation by means of the semi-circular annular ring 23 which is joined in the manner shown to the outer edges of the outer sleeve 13 and the ring 22. The semi-circular annular ring 23 serves to protect the outer annulus of the protector during rough handling operations, as for example, when one end of the pipe is dragged along a floor or the ground, the ring providing a smooth surface to ride over obstructions.

As will be observed from Figure 1, the tubular member 19 is spaced radially away from the adjacent inner circumferential wall portion of the pipe 10 to provide the toroidal recess 15 in which there is positioned a toroidal bladder 24 formed of suitable resilient material such as rubber, polyvinyl plastic, and the like. The bladder 24 is provided with an air inlet valve 25 and an air discharge valve 26, of usual and well known types, which extend radially inwardly through the holes 27 and 28, respectively, in the tubular member 19. The bladder 24 is adapted, in its non-inflated condition, for disposition of its outer circumferential wall portion 29 in loosely spaced relation to the adjacent circumferential wall portion of the pipe 10 such that the protector can be easily applied to the end of the pipe.

In operation, the protector is first positioned on the end of a pipe having threads to be protected, and air under pressure is then supplied to the interior of the bladder through the valve 25 to pneumatically expand the bladder into a state of compression between the inner sleeve portion 14 and the inner circumferential wall portion of the pipe 10. The bladder 24 will in such state of compression yieldably retain the protector against dislodgement on the end of the pipe and the threads 11 will be protected against damage during handling of the pipe while in transportation and storage. When it is desired to remove the protector, as for example at its place of installation in the field, the valve 26 is actuated to permit the air to quickly escape from the interior of the bladder which, because of its resiliency, will return to its non-inflated condition, thus permitting the protector to be conveniently and rapidly removed from the end of the pipe.

In order to facilitate in the handling of the protector during the installation and removal operations, or at times in the handling of the pipe, the protector may be provided with a bar 30 which extends, in the manner shown, transversely, across the outer end of the protector, the bar being welded to opposite points on the inner circumference of the circular flange 21.

Figure 3:
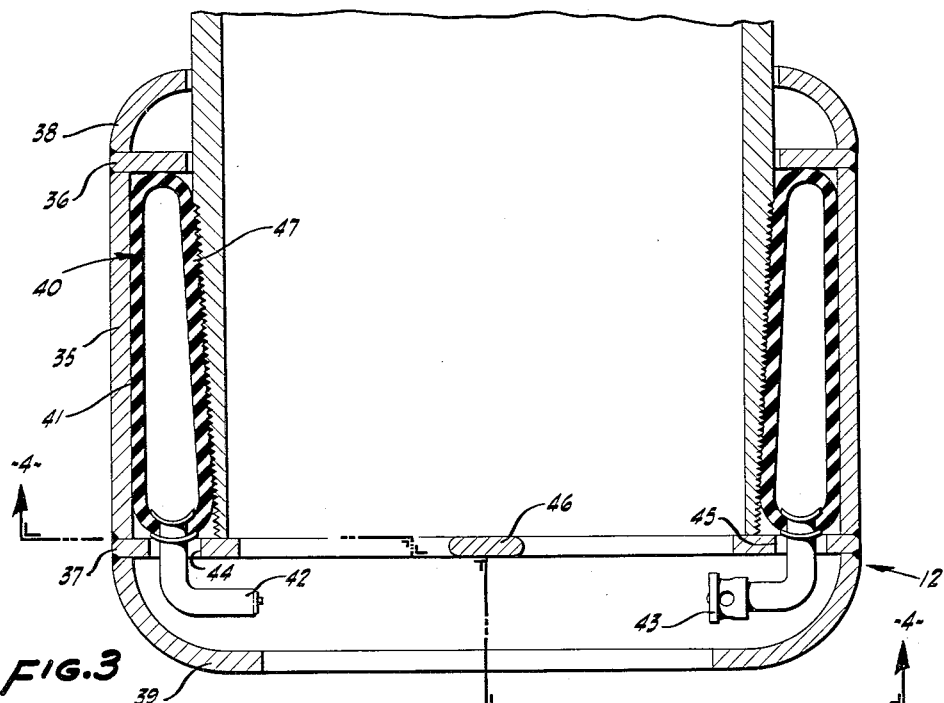
Figure 3 is a longitudinal sectional view showing a modified cylindrical shell member and toroidal bladder embodying the present invention.
Figure 4:
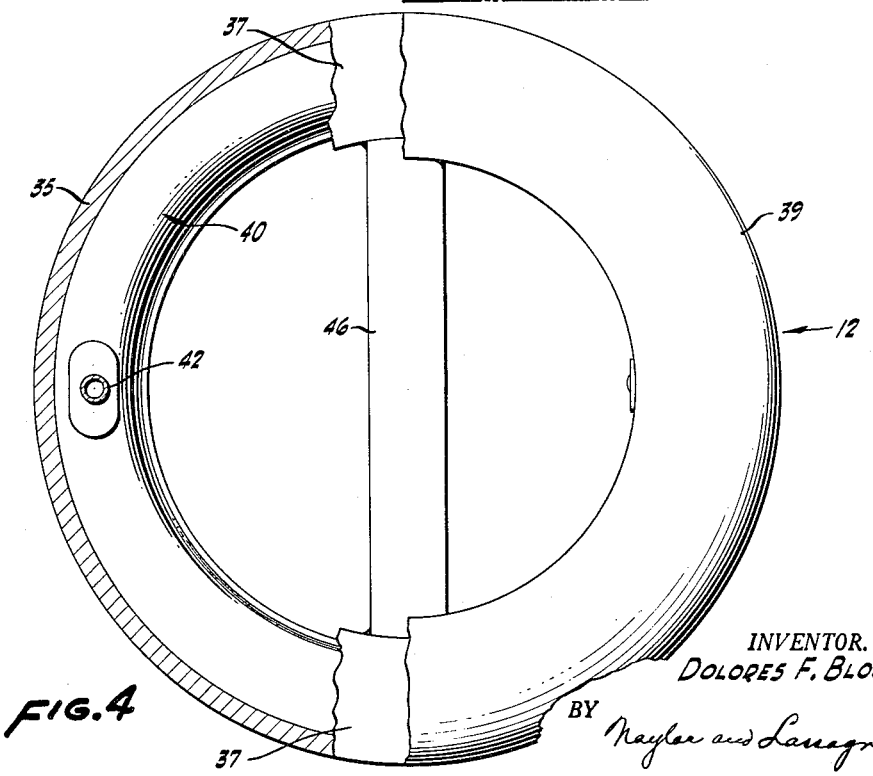
Figure 4 is an end view in elevation, partly in section, taken along line 4—4 of Figure 3.

Referring now to Figures 3 and 4, there is illustrated a modified embodiment of my invention, in which the cylindrical shell member, similarly designated by the numeral 12, comprises but a single and outer sleeve portion, shaped to provide a toroidal recess, which includes the following structure: a tubular member 35, transverse annular rings 36 and 37 laterally spaced by the tubular member 35 and curved end members 38 and 39, respectively; such members being secured in a suitable manner, as for example by welding as shown. If desired, the tubular member 35 and the curved end members 38 and 39 may be made in one piece and the annular rings 36 and 37 welded thereto in their respective positions as shown. The inner circumferential ends of the members 36 and 38 are of a diameter slightly larger than the outside diameter of the pipe 10, as to be in close fitting engagement therewith beyond the threaded area 11 while the inner circumferential diameter of the annular ring 37 is such that the ring 37 will lie against the end surface of the pipe wall. As will be observed, the tubular member 35 is spaced radially away from the threaded area 11 to provide a toroidal recess 40 in which there is positioned a toroidal bladder 41 identical to the bladder 24 of Figures 1 and 2. The bladder 41 is similarly provided with an air inlet valve 42 and an air outlet valve 43 which extend in the manner shown longitudinally from the ends of the bladder 41, through the holes 44 and 45 in the annular ring 37, and into the cavity formed by the curved end member 39 where they are then bent as to extend in a radial and inward direction. The outer and circumferential end of the annular ring 39 is preferably of such diameter as extends slightly inwardly of the ends of the valves 42 and 43 to protect the same and a bar 46 may be provided to facilitate in the handling of the protector during installation and removal operations.

The operation of the protector is similar to that of Figures 1 and 2. The inner circumferential wall portion 47 of the bladder 41 is adapted, when the bladder 41 is in its non-inflated condition, for disposition in loosely spaced relation adjacent to the threaded area 11 of the pipe. In this respect, the inner circumferential wall portion 47 may be of equal diameter throughout its longitudinal length or may be tapered inwardly toward its outer edge corresponding to the taper of the end of the pipe. When air under pressure is supplied to the interior of the bladder 41 through the valve 42, the bladder is pneumatically expanded into a state of compression between the cylindrical shell member 12 and the threaded area 11 of the pipe to securely retain the protector against dislodgment and when such air is later discharged from the bladder through the valve 43, the resilient bladder will return to its non-inflated condition and the protector thus conveniently and rapidly removed from the end of the pipe.

While I have thus described my invention in accordance with two of its embodiments, it is understood that various modifications may be made without departing from the scope of the invention, as defined in the following claims.

What is claimed is:

1. A pneumatically actuated pipe thread protector comprising a cylindrical member adapted to enclose the threaded end of an externally threaded pipe section and having a rigid wall substantially paralleling the external wall of said pipe section, means, including a soft, flexible member contiguous to the external threading of said pipe section, for defining an enclosed air space capable of retaining air under pressure between the rigid wall of said cylindrical member and the externally threaded wall of said pipe section, and valve means for controlling the admission, retention and release of air under pressure within said air space; whereby said soft, flexible member may be pressed into engagement with the threaded portion of said pipe section to exclude foreign material from the threads and retain the protector in position thereon, and subsequently released to permit removal of said protector from said pipe section.

2. A pneumatically actuated pipe thread protector according to claim 1 in which said means for defining an enclosed air space is in the form of a toroidal bladder of soft, flexible material.

3. A pneumatically actuated pipe thread protector comprising a cylindrical member adapted to enclose the threaded end of an externally threaded pipe section and having a rigid wall substantially paralleling the external wall of said pipe section, a pair of annular members extending inwardly from said cylindrical member and defining a toroidal recess adapted to be disposed around the external threading of such a pipe section when said cylindrical member is positioned over the end of the pipe section, a soft, flexible member extending into contact with said annular members and defining an enclosed air space capable of retaining air under pressure within said toroidal recess; said air space having a wall constituted by said soft, flexible member which is disposed adjacent said pipe wall, and valve means for controlling the admission, retention and release of air under pressure within said air space; whereby said soft, flexible member may be pneumatically pressed into engagement with the threaded portion of said pipe section to exclude foreign material from the threads and retain the protector in position thereon, and subsequently released to permit removal of said protector from said pipe section.

References Cited in the file of this patent

UNITED STATES PATENTS

| 1,564,315 | Avery | Dec. 8, 1925 |
| 1,931,702 | McCreary | Oct. 24, 1933 |
| 2,034,423 | Shrum | Mar. 17, 1936 |
| 2,161,197 | Protin | June 6, 1939 |
| 2,559,564 | Sperling | July 3, 1951 |

FOREIGN PATENTS

| 27,492 | Great Britain | Dec. 16, 1904 |